United States Patent
Kildal et al.

(10) Patent No.: US 9,702,723 B2
(45) Date of Patent: Jul. 11, 2017

(54) METHOD AND APPARATUS FOR RECEIVING USER ESTIMATION OF NAVIGATIONAL INSTRUCTIONS

(75) Inventors: Johan Kildal, Helsinki (FI); Vuokko Tuulikki Lantz, Vantaa (FI); Roope Raisamo, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/409,806

(22) Filed: Mar. 1, 2012

(65) Prior Publication Data

US 2013/0231127 A1 Sep. 5, 2013

(51) Int. Cl.
G01C 21/36 (2006.01)
(52) U.S. Cl.
CPC ..... *G01C 21/3664* (2013.01); *G01C 21/3626* (2013.01); *G01C 21/3652* (2013.01)
(58) Field of Classification Search
CPC ............ G01C 21/3626; G01C 21/3652; G01C 21/3655; G01C 21/3658; G01C 21/3664
USPC .................... 701/538, 539; 340/407.1, 407.2
See application file for complete search history.

(56) References Cited

U.S. PATENT DOCUMENTS

| | | | |
|---|---|---|---|
| 5,807,111 A * | 9/1998 | Schrader ...................... 434/112 |
| 6,320,496 B1 | 11/2001 | Sokoler et al. |
| 6,940,451 B2 * | 9/2005 | Kanerva ................... 342/357.31 |
| 7,788,032 B2 * | 8/2010 | Moloney .................... 340/407.1 |
| 7,873,471 B2 * | 1/2011 | Gieseke ......................... 701/416 |
| 8,098,234 B2 * | 1/2012 | Lacroix et al. ............... 345/173 |
| 8,126,643 B2 * | 2/2012 | Lehtiniemi et al. .......... 701/425 |
| 8,457,654 B1 * | 6/2013 | Roskind ...................... 455/456.1 |
| 8,462,125 B2 * | 6/2013 | Birnbaum et al. ............ 345/173 |
| 8,493,354 B1 * | 7/2013 | Birnbaum et al. ............ 345/173 |
| 8,706,415 B2 * | 4/2014 | Su et al. ....................... 701/533 |
| 2002/0109668 A1 * | 8/2002 | Rosenberg et al. ........... 345/156 |

(Continued)

FOREIGN PATENT DOCUMENTS

| | | |
|---|---|---|
| DE | 10 2007 031795 A1 | 1/2009 |
| DE | 10 2009 045459 A1 | 4/2011 |

(Continued)

OTHER PUBLICATIONS

Grohn-Rassmus, Kirsten; Molina, Miguel; Magnusson, Charlotte; and Szymczak, Delphine; "An Audio-Haptic Mobile Guide for Non-Visual Navigation and Orientation"; Downloaded on May 17, 2012 at http://www.english.certec.lth.se/haptics/HaptiMap/37-AudioHapticGuide-print.pdf.

(Continued)

*Primary Examiner* — Jerrah Edwards
*Assistant Examiner* — Donald J Wallace
(74) *Attorney, Agent, or Firm* — Alston & Bird LLP

(57) ABSTRACT

A method, apparatus and computer program product are provided in order to provide navigational instructions in a manner that does not require the user to view the navigational instructions. In the context of a method, user input is received that is representative of an estimation by the user of a navigational instruction. The method also determines whether the estimation by the user matches the navigational instruction. Further, the method causes feedback to be generated at least in an instance in which the estimation by the user fails to match the navigational instruction. A corresponding apparatus and computer program product are also disclosed.

20 Claims, 3 Drawing Sheets

(56) References Cited

U.S. PATENT DOCUMENTS

| | | | |
|---|---|---|---|
| 2002/0111737 A1 | 8/2002 | Hoisko | |
| 2005/0060088 A1* | 3/2005 | Helal et al. | 701/208 |
| 2005/0216190 A1 | 9/2005 | Obata | |
| 2006/0190168 A1 | 8/2006 | Ohnishi et al. | |
| 2006/0288137 A1* | 12/2006 | Grant et al. | 710/62 |
| 2007/0106457 A1* | 5/2007 | Rosenberg | 340/407.1 |
| 2008/0120029 A1* | 5/2008 | Zelek et al. | 701/213 |
| 2008/0170118 A1 | 7/2008 | Albertson et al. | |
| 2009/0073112 A1* | 3/2009 | Basson et al. | 345/156 |
| 2009/0167508 A1* | 7/2009 | Fadell et al. | 340/407.2 |
| 2009/0177392 A1 | 7/2009 | Komaba | |
| 2010/0125816 A1* | 5/2010 | Bezos | G06F 1/1626 715/863 |
| 2010/0198458 A1 | 8/2010 | Buttolo et al. | |
| 2010/0280713 A1* | 11/2010 | Stahlin et al. | 701/41 |
| 2011/0010088 A1* | 1/2011 | Nagase | 701/201 |
| 2011/0054773 A1 | 3/2011 | Chi et al. | |
| 2011/0054775 A1* | 3/2011 | Snyder | G01C 21/3655 701/533 |
| 2012/0300061 A1* | 11/2012 | Osman | G06F 1/3231 348/135 |
| 2014/0232534 A1* | 8/2014 | Birnbaum et al. | 340/407.1 |
| 2014/0313021 A1* | 10/2014 | Radivojevic et al. | 340/407.1 |
| 2014/0358427 A1* | 12/2014 | Fuhrman | G01C 21/3602 701/452 |

FOREIGN PATENT DOCUMENTS

| | | | | |
|---|---|---|---|---|
| DE | 102009045459 | * | 4/2011 | G01C 21/26 |
| EP | 0 560 987 A1 | | 9/1993 | |
| WO | WO 2009/074663 A1 | | 6/2009 | |

OTHER PUBLICATIONS

International Search Report and Written Opinion for Application No. PCT/FI2013/050188, dated Jun. 12, 2013.

* cited by examiner

METHOD AND APPARATUS FOR RECEIVING USER ESTIMATION OF NAVIGATIONAL INSTRUCTIONS

TECHNOLOGICAL FIELD

An example embodiment of the present invention relates generally to user navigation and, more particularly, to the provision of navigational instructions.

BACKGROUND

Navigational instructions are commonly provided in order to direct users to a destination. The navigational instructions may direct a user who is driving, walking, bicycling or otherwise moving towards the destination. In some instances, the navigational instructions are provided in the form of a map with textual or other visual indicators, such as arrows, to indicate the directions to be taken to advance towards the destination. When approaching an intersection, for example, the navigational instructions may indicate whether the user should proceed through the intersection, should turn right at the intersection or should turn left at the intersection. Although navigational instructions in the form of a map are commonly provided, the navigational instructions may be provided in other manners including as a series of textual directions to be read by the user.

In many instances, the navigational instructions are provided by a mobile terminal, such as a mobile telephone, a personal digital assistant (PDA), a tablet computer or the like, that is carried by the user as the user proceeds towards the destination. Although the navigational instructions are helpful to direct the user to the intended destination, the navigational instructions are commonly presented in a manner that requires the user to view the mobile terminal, such as the display of the mobile terminal, in order to interpret the navigational instructions. In other words, a mobile terminal may provide navigational instructions in the form of one or more visual indications, such as a map, textual directions or the like, that must be viewed by the user in order to interpret the navigational instructions.

In some instances, the user may be unable or may otherwise not wish to view the navigational instructions provided by a mobile terminal. For example, a user may be driving and therefore unable to divert their attention from the roadway in order to view the navigational instructions provided by the mobile terminal. Alternatively, the mobile terminal upon which the navigational instructions are presented may be in a pocket of an article of clothing worn by the user such that the navigational instructions presented upon a display of the mobile terminal may not be visible to the user. Still further, the user may be engaged in conversation with another person or may otherwise be focused on another task and may not wish to divert their attention in order to view the display of the mobile terminal upon which the navigational instructions are presented. Additionally, the provision of navigational instructions in the form of one or more visual indications, such as a map, textual directions or the like is particularly challenging and, in some instances, useless for users who are blind or are otherwise visually limited.

Although navigational instructions are commonly presented in the form of one or more visual indications, navigational instructions may sometimes be presented in other manners, such as via non-visual indications, e.g., via audible indications. In some instances, the user may find such non-visual indications of the navigational instructions to be distracting or intrusive, such as in a situation in which the announcement of audible indications would be undesirable or inappropriate.

BRIEF SUMMARY

A method, apparatus and computer program product may therefore be provided in accordance with an example embodiment of the present invention in order to provide navigational instructions in a manner that does not require the user to view the navigational instructions. Thus, a user may effectively receive the navigational instructions in accordance with a method, apparatus and computer program product of an example embodiment, but may do so without having to divert their attention or otherwise view a display in order to view the navigational instructions.

In one embodiment, a method is provided that includes receiving user input representative of an estimation by a user of a navigational instruction. The method of this embodiment also determines, with a processor, whether the estimation by the user matches the navigational instruction. Further, the method of this embodiment causes feedback to be generated at least in an instance in which the estimation by the user fails to match the navigational instruction.

The method of one embodiment may also cause a non-visual indication to be generated regarding the navigational instruction. For example, the method may cause the non-visual indication to be generated regarding an upcoming navigational instruction prior to provision of the navigational instruction. In this example embodiment, the feedback may be generated by causing the navigational instruction to be provided in an instance in which the estimation by the user fails to match the navigational instruction.

In addition to generating feedback in an instance in which the estimation by the user fails to match the navigational instruction, the method of one embodiment may cause feedback to be generated in an instance in which the estimation by the user matches the navigational instruction. In one embodiment, the method causes feedback to be generated by causing non-visual feedback to be generated. The method of one embodiment may optionally also cause a visual indication of the navigational instruction to be generated.

In another embodiment, an apparatus is provided that includes at least one processor and at least one memory storing computer program code with the at least one memory and the computer program code configured to, with the processor, cause the apparatus to at least receive user input representative of an estimation by a user of a navigational instruction. The at least one memory and the computer program code of one embodiment are also configured to, with the processor, cause the apparatus to determine whether the estimation by the user matches the navigational instruction. Further, the at least one memory and the computer program code of this embodiment are also configured to, with the processor, cause the apparatus to cause feedback to be generated at least in an instance in which the estimation by the user fails to match the navigational instruction.

The at least one memory and the computer program code of one embodiment are also configured to, with the processor, cause the apparatus to cause a non-visual indication to be generated regarding the navigational instruction. For example, the non-visual indication may be generated regarding an upcoming navigational instruction prior to provision of the navigational instruction. In this example embodiment, the feedback may be generated by causing the navigational instruction to be provided in an instance in which the estimation by the user fails to match the navigational instruction.

In addition to generating feedback in an instance in which the estimation by the user fails to match the navigational instruction, the at least one memory and the computer program code of one embodiment are also configured to, with the processor, cause the apparatus to cause feedback to be generated in an instance in which the estimation by the user matches the navigational instruction. In one embodiment, the at least one memory and the computer program code are also configured to, with the processor, cause the apparatus to cause feedback to be generated by causing non-visual feedback to be generated. The at least one memory and the computer program code of one embodiment are also optionally configured to, with the processor, cause the apparatus to cause a visual indication of the navigational instruction to be generated.

In a further embodiment, a computer program product is provided that includes at least one non-transitory computer-readable storage medium having computer-executable program code portions stored therein with the computer-executable program code portions including program instructions configured to receive user input representative of an estimation by a user of a navigational instruction. The computer-executable program code portions of this embodiment also include program instructions configured to determine whether the estimation by the user matches the navigational instruction. Further, the computer-executable program code portions of this embodiment also include program instructions configured to cause feedback to be generated at least in an instance in which the estimation by the user fails to match the navigational instruction.

The computer-executable program code portions of one embodiment also include program instructions configured to cause a non-visual indication to be generated regarding the navigational instruction. For example, the non-visual indication may be generated regarding an upcoming navigational instruction prior to provision of the navigational instruction. In this example embodiment, the feedback may be generated by causing the navigational instruction to be provided in an instance in which the estimation by the user fails to match the navigational instruction.

In addition to generating feedback in an instance in which the estimation by the user fails to match the navigational instruction, the computer-executable program code portions of one embodiment also include program instructions configured to cause feedback to be generated in an instance in which the estimation by the user matches the navigational instruction. In one embodiment, the computer-executable program code portions also include program instructions configured to cause feedback to be generated by causing non-visual feedback to be generated.

In one embodiment, an apparatus is provided that includes means for receiving user input representative of an estimation by a user of a navigational instruction. The apparatus of this embodiment also includes means for determining whether the estimation by the user matches the navigational instruction. Further, the apparatus of this embodiment also includes means for causing feedback to be generated at least in an instance in which the estimation by the user fails to match the navigational instruction.

BRIEF DESCRIPTION OF THE DRAWINGS

Figure 1:
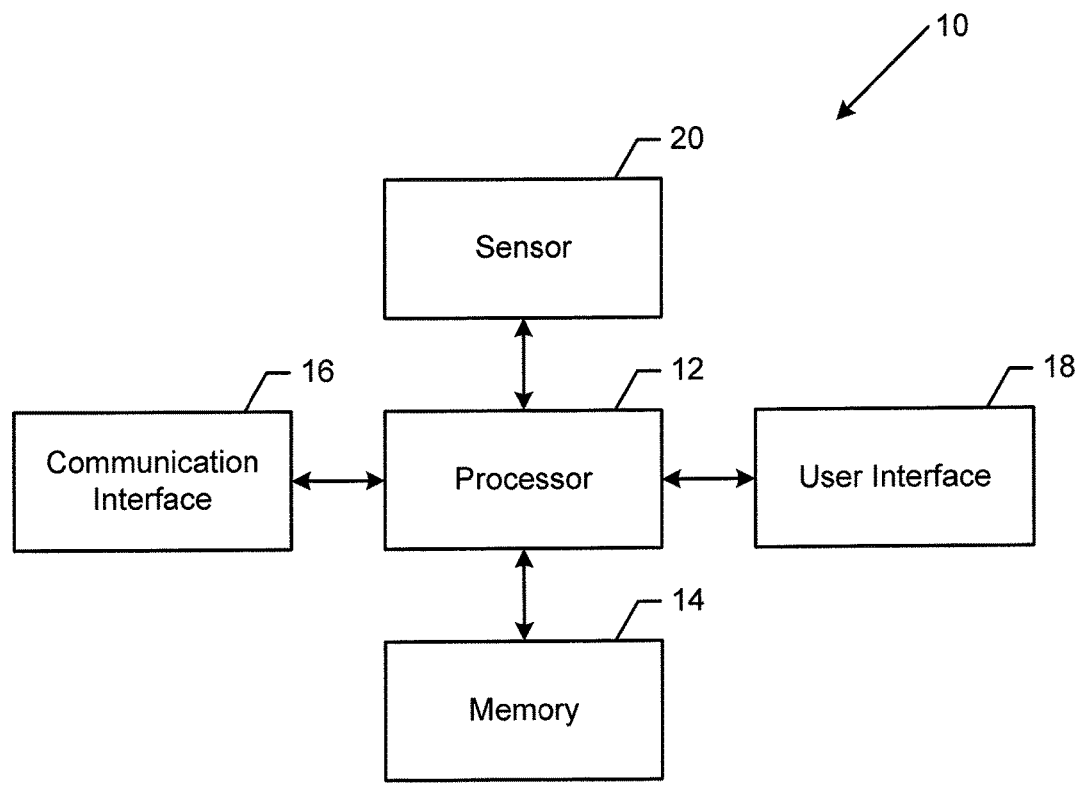
Figure 2:
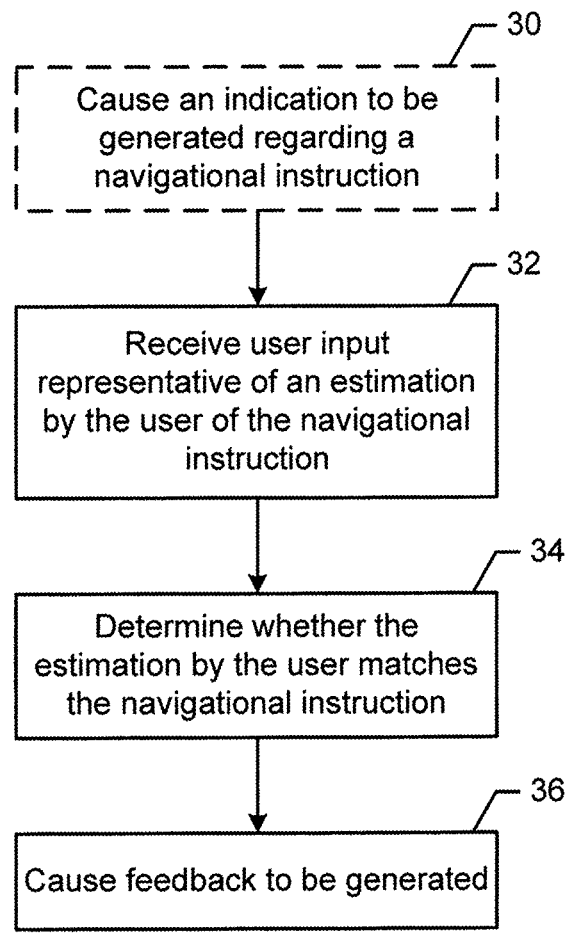
Figure 3:
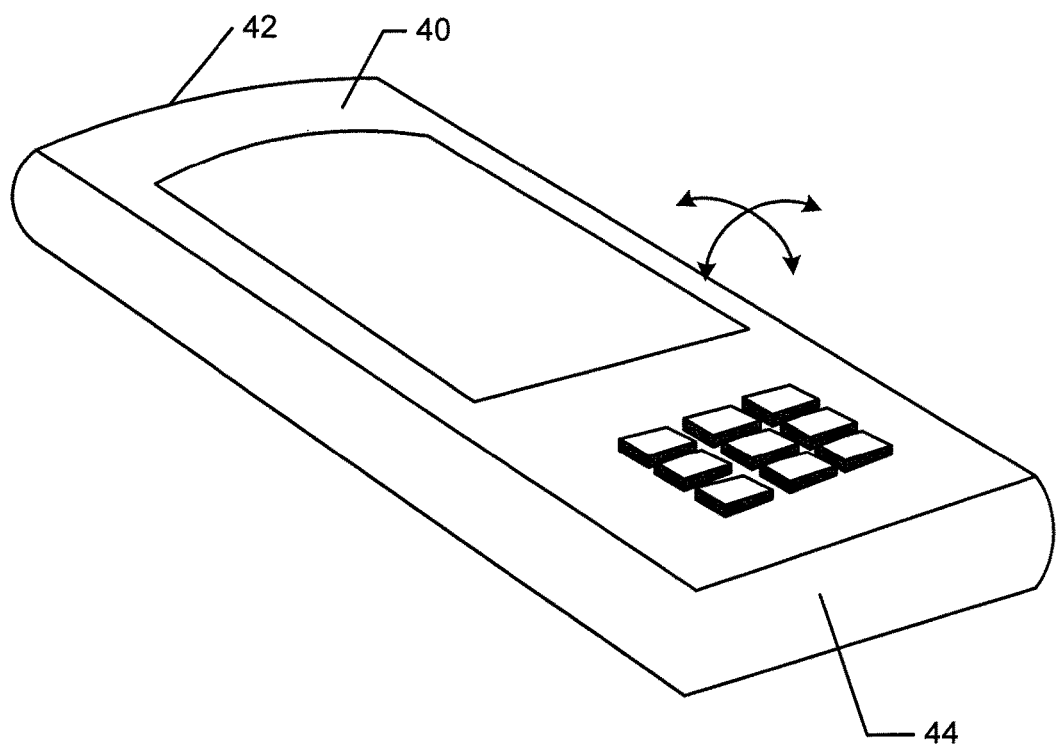

Having thus described certain example embodiments in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating operations performed in accordance with an example embodiment to the present invention; and FIG. 3 is a perspective view of a mobile terminal illustrating examples of user input representative of the estimation by the user of a navigational instruction in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

In accordance with an example embodiment of the present invention, a method, apparatus and computer program product are provided to permit a user to confirm their understanding of the navigational instructions in a manner that does not require the user to divert their attention from their current activities in order to view the display of the navigational instructions so as to interpret the navigational instructions. Indeed, the method, apparatus and computer program product of an example embodiment may permit a user to provide input representative of their estimation of the navigational instructions and to receive feedback, at least in an instance in which the estimation of the user fails to match the navigational instructions. As such, a user need not await the provision of a navigational instruction or, in the event that a navigational instruction has been provided, need not view the navigational instruction, but may provide input representative of their estimation of the navigational instruction and may receive feedback indicative of the validity of their estimation. Accordingly, the user may proceed toward the destination based upon their estimation of the navigational instructions, but with the security of knowing that they will be alerted in an instance in which their estimation of the navigational instructions deviates from the actual navigational instructions.

The method, apparatus and computer program product of one example embodiment may be embodied by a user device. Various types of user devices may embody example embodiments of the present invention including, for example, a mobile terminal, a navigational system, e.g., a global positioning system (GPS) that may either be mounted within a vehicle or be handheld, eyewear, e.g., eyeglasses, a head mounted display or the like. By way of example, but not of limitation, the method, apparatus and computer program product of certain example embodiments will be hereinafter described in conjunction with a mobile terminal. In this regard, a variety of mobile terminals may embody the apparatus including, for example, a mobile communication device such as a mobile telephone, PDA, pager, laptop computer, tablet computer, or any of numerous other hand held or portable communication devices, computation devices, content generation devices, content consumption devices, or combinations thereof.

In one embodiment, navigational instructions may be generated based upon the current position of the user and the intended destination. Although the intended destination may be provided by the user, the user device may determine its current position, such as by use of a GPS or other position determination system. Based upon the current position of the user and the intended destination, the navigational instructions may be generated, such as by the user device or by another device, such as network entity, e.g., a navigation server, that is in communication with the user device, such as via a wireless connection. As described herein, the apparatus 10 that embodies an example embodiment of the present invention may include the system(s) for determining the position of the user device and/or generating the navigational instructions. In other embodiments, however, the apparatus need not include the system(s) for determining the position of the user device and/or generating the navigational instructions and, instead, the apparatus may communicate with another device that determines the position of the user device and/or generates the navigational instructions and may receive the navigational instructions from the other device.

Regardless of the type of user device and, indeed, the type of mobile terminal that embodies the apparatus 10, the apparatus of an example embodiment is shown in FIG. 1 and may include various means, such as a processor 12, memory 14, communication interface 16, user interface 18 and sensor(s) 20 for performing the various functions herein described. These means of the apparatus as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory) that is executable by a suitably configured processing device (e.g., the processor), or some combination thereof.

The processor 12 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor comprises a plurality of processors. In an example embodiment, the processor is configured to execute instructions stored in the memory 14 or otherwise accessible to the processor. These instructions, when executed by the processor, may cause the apparatus to perform one or more of the functionalities of the mobile terminal as described herein. As such, whether configured by hardware or software methods, or by a combination thereof, the processor may represent an entity configured to perform operations according to embodiments of the present invention when configured accordingly. Thus, for example, when the processor is embodied as an ASIC, FPGA or the like, the processor may comprise specifically configured hardware for conducting one or more operations described herein. Alternatively, as another example, when the processor is embodied as an executor of instructions, the instructions may specifically configure the processor to perform one or more algorithms and operations described herein.

The memory 14 may include, for example, non-transitory volatile and/or non-volatile memory. Although illustrated in FIG. 1 as a single memory, the memory may comprise a plurality of memories. The memory may comprise volatile memory, non-volatile memory, or some combination thereof. In this regard, the memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory may be configured to store information, data, applications, instructions, or the like for enabling the mobile terminal to carry out various functions in accordance with some example embodiments of the present invention. For example, in at least some embodiments, the memory is configured to buffer input data for processing by the processor 12. Additionally or alternatively, in at least some embodiments, the memory is configured to store program instructions for execution by the processor. The memory may store information in the form of static and/or dynamic information.

The communication interface 16 may be embodied as any device or means embodied in hardware, a computer program product comprising computer readable program instructions stored on a computer readable medium (e.g., the memory 14) and executed by a processing device (e.g., the processor 12), or a combination thereof that is configured to receive and/or transmit data from/to a remote device over a network. In this regard, the communication interface may be configured to transceive data over a public land mobile network (PLMN) network (e.g., a cellular network implementing universal mobile telecommunications service (UMTS) terrestrial radio access network (UTRAN), evolved UTRAN (E-UTRAN) and/or long term evolution (LTE) standards) operated by a network operator. In at least one embodiment, the communication interface is at least partially embodied as or otherwise controlled by the processor. In this regard, the communication interface may be in communication with the processor, such as via a bus. The communication interface may include, for example, an antenna, a transmitter, a receiver, a transceiver and/or supporting hardware or software for enabling communications with other entities of the system. The communication interface may be configured to receive and/or transmit data using any protocol that may be used for communications between computing devices of the system. The communication interface may additionally be in communication with the memory and/or user interface 18, such as via a bus.

The user interface 18 may be in communication with the processor 12 to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms, such as a vibrator, a haptic actuator or other source of haptic output. The user interface may be in communication with the memory 14 and/or communication interface 16, such as via a bus.

As shown in FIG. 1, the apparatus 10 may also include one or more sensors 20. The apparatus may include various types of sensors including, for example, one or more accelerometers, one or more motion sensors or the like for detecting motion of the mobile terminal and the direction of any such motion about two or more mutually orthogonal axes. Other sensors that may also or alternatively be included include touch sensors, such as the touch sensors included within a touch sensitive display.

Referring now to FIG. 2, the operations performed by the apparatus 10 embodied by a mobile terminal in accordance with an example embodiment of the present invention are illustrated. With reference to block 32 of FIG. 2, the apparatus of one embodiment includes means, such as the processor 12, the communication interface 16 or the like, for receiving user input representative of the estimation of the user of the navigational instructions. Various types of user input may be provided including, for example, movement of the mobile terminal in a manner representative of the user input. As described herein, the mobile terminal that embodies the apparatus may be configured to receive the user input. In other embodiments, the user input may be received by another device. For example, in an instance in which the user is anticipated to be in a vehicle, such as driving a vehicle, while utilizing an embodiment of the present invention, the vehicle may include one or more other devices for receiving the user input. For example, the steering wheel could include touch sensors such that a user could provide input by touching or firmly grasping predefined portions of the steering wheel, such as by grasping the left or right sides of the steering wheel to provide user input representative of the user's estimation that the navigational instruction is to turn left or right, respectively. Additionally or alternatively, the seat could include weight sensors such that a user could provide input by appropriately shifting their weight in the seat, such as by shifting their weight to the left or to the right to provide user input representative of the user's estimation that the navigational instruction is to turn left or right, respectively. In the other embodiments in which the user input is received by another device, the apparatus may communicate with the other device, such as via a wireless or a wireline connection, in order to receive a representation of the user input from the other device.

With respect to a mobile terminal 40 of the type shown in FIG. 3, the mobile terminal may be rotated such that a first end 42 of the mobile terminal proximate the earpiece is rotated downwardly relative to the opposed, second end 44 of the mobile terminal to indicate the user's estimation that the navigational instruction instructs the user to proceed straight ahead, such as by proceeding across an intersection. Alternatively, the mobile terminal of this embodiment may be configured to be rotated to the right by moving the right side of the mobile terminal downwardly relative to the left side of the mobile terminal to indicate the user's estimation that the navigational instruction indicates that a user should turn to the right, such as at the next intersection. Conversely, the mobile terminal of this embodiment may be configured to be rotated to the left by moving the left side of the mobile terminal downwardly relative to the right side of the mobile terminal to indicate the user's estimation that the navigational instruction instructs the user to turn to the left, such as at the next intersection.

In the foregoing example embodiment, the apparatus 10 embodied by the mobile terminal 40 may include a sensor 20, such as an accelerometer or other motion sensor, in order to detect movement of the mobile terminal and to provide information to the processor 12 indicative of the movement. The processor of this embodiment is then able to interpret the user's estimation of the navigational instructions based upon their movement of the mobile terminal.

Although one example of user input is provided above, the apparatus 10 of other embodiments may be configured to detect other types of user input. For example, the user input may take the form of touch input such that the apparatus includes touch sensors for detecting the touch input and providing information to the processor 12 indicative of the touch input. As another example, the user input may take the form of audible instructions, such as "go straight", "turn right" or "turn left", that are spoken by the user and received by a microphone of the mobile terminal 40. In a further example, the user input may take the form of one or more predefined gestures. Regardless of the type of user input, the user input is representative of the user's estimation of the next navigational instruction and may be provided by the user prior to having viewed or otherwise taken into account the navigational instructions.

In this regard, the user input may be provided without requiring the user to view the mobile terminal 40, such as the display of the mobile terminal. Instead, the user may maintain their focus upon their current activity, but may provide the input representative of their estimation of the navigational instructions, such as by appropriately moving the mobile terminal, in order to confirm their understanding of the directions.

The user input may be provided before, after or concurrent with the provision of the navigational instructions. In one embodiment in which the user input representative of the estimation of the user of the navigational instructions is provided prior to the provision of the navigational instructions and in which the estimation of the user of the navigational instructions is valid, the navigational instructions need not necessarily be provided at all since the user is already aware of the direction of travel. In the embodiment in which the user input is provided in advance of the provision of the navigational instruction, the apparatus 10 embodied by the mobile terminal 40 may include means, such as the processor 12, the user interface 18 or the like, for causing an indication to be generated regarding the navigational instruction. See block 30 of FIG. 2. The indication regarding the navigational instruction may be provided in advance of the navigational instruction itself and may serve to capture the user's attention. Thus, the indication may be an alert or other notification that a navigational instruction is to be provided in the near future, such as within a predefined time period. Various types of indications may be provided by the user interface. In one embodiment, the indication is a non-visual indication, such as an audible alert, a haptic indication, such as the vibration of the mobile terminal, or the like. In another embodiment, the indication that is generated is a visual indication, such as the flashing of the display, that may alert the user even though the user does not need to study the display of the mobile terminal in order to discern the visual indication. Regardless of the type of indication that is provided, a user may receive the indication regarding the navigational instruction and may, in turn, provide the user input representative of the estimation of the user of the impending navigational instruction.

Although the indication regarding the navigational instruction may be generated prior to the provision of the navigational instruction, the indication regarding the navigational instruction may, in some embodiments, be the provision of the navigational instruction itself. In this embodiment, a user may notice that a navigational instruction has been provided, such as by the presentation of a map upon the display of the mobile terminal or the presentation of textual or other visual indicators upon the display of the mobile terminal. Although the user may notice the provision of the navigational instruction, the user need not focus upon the navigational instruction in an effort to interpret the navigational instruction, but may, instead, provide the user input representative of their estimation of the navigational instruction that has been provided.

Regardless of the timing of the user input that is representative of the estimation of the user of the navigational instruction relative to the provision of the navigational instruction, the apparatus 10 embodied by the mobile terminal 40 may include means, such as the processor 12 or the like, for determining whether the estimation of the user matches the navigational instruction. See block 34 of FIG. 2. In this regard, the estimation of the user may be determined to match the navigational instruction in an instance in which the user input is correlated to or otherwise associated with a navigational instruction that is substantively identical to the navigational instruction that has been or will be provided. In this embodiment, each of a plurality of different types of user inputs may be associated with respective navigational instructions, such as those described above in conjunction with FIG. 3. The association of the user inputs with respective navigational instructions may be predefined or may be established by the user during a training phase in which, for example, a series of navigational instructions are provided and the user responds to each navigational instruction by providing the user input that will be associated with the respective navigational instruction. By detecting the user input provided during the training phase, the apparatus of this embodiment may associate each user input with a respective navigational instruction. As such, the apparatus of this embodiment, such as the memory 14, may include the identification of a plurality of different user inputs and the associated navigational instructions so as to facilitate the determination by the processor as to whether the estimation by the user matches the navigational instruction.

The apparatus 10 embodied by the mobile terminal 40 may also include means, such as the processor 12, the user interface 18 or the like, for causing feedback to be generated, at least in an instance in which the estimation by the user fails to match the navigational instruction. See block 36 of FIG. 2. In this regard, the user may be spared from making a wrong turn or otherwise being misdirected based upon their incorrect estimation and may, instead, be alerted to the inaccuracy of their estimation. Various types of feedback may be provided including nonvisual types of feedback, such as audible alerts, haptic feedback or the like. Additionally or alternatively, the feedback may include visual feedback, such as the flashing of the display of the mobile terminal or the provision of other visual cues, to alert the user of the mismatch between their estimation and the navigational instruction.

Based upon the feedback, the user may provide a further user input representative of another (typically, a different) estimation of the navigational instruction and may, in turn, receive further feedback, at least in an instance in which the further user input still fails to match the navigational instruction. This process may be repeated any number of times. Alternatively, in response to the feedback, the user may refer to the navigational instruction that has now been provided in order to determine the correct direction of travel.

In one embodiment, the feedback that is generated includes the provision of the navigational instructions, such as by the presentation of a map or other textual or visual instructions upon the display of the mobile terminal 40. As such, in one embodiment, the navigational instruction may be provided as feedback to the user in an instance in which the estimation of the user fails to match the navigational instruction, but optionally need not be provided in an instance in which the estimation of the user matches the navigational instruction.

Although the apparatus 10 embodied by the mobile terminal 40, such as the processor 12 or the user interface 18, may provide feedback in an instance in which the estimation of the user fails to match the navigational instructions, the apparatus, such as the processor or the user interface, may also provide feedback in an instance in which the estimation provided by the user does match the navigational instruction. In this embodiment, the feedback may confirm to the user that their estimation is correct such that they may proceed toward the destination with confidence. In one embodiment, the apparatus may provide the user with an option to receive the navigational instructions even in an instance in which the user's estimation matches the navigational instruction, thereby providing the user with the option to review, for example, a map or other visual representation of the navigational instructions that may provide additional context to the navigational instructions.

In one embodiment, the apparatus 10, such as the processor 12 or the user interface 18, may only provide feedback in an instance in which the user's estimation fails to match the navigational instruction. Thus, feedback is not provided in accordance with this embodiment in an instance in which the user's estimation is determined to match the navigational instruction. This restriction of the feedback, be it either visual feedback or non-visual feedback, to only those instances in which the user's estimation fails to match the navigational instruction may address issues that can arise from the provision of navigational instructions that may be distracting, intrusive or otherwise unwanted. Indeed, in an embodiment in which the apparatus does not cause an indication to be generated regarding the navigational instruction such as shown in optional block 30 of FIG. 2, the apparatus may be configured to not provide any visual or non-visual indications of the navigational instructions and to not provide any feedback such that there is no distraction or intrusion created for the user so long as the user's estimation of the navigational instructions is correct. Thus, the user of an apparatus of this embodiment may be fully in control of the provision of navigational instructions and may avoid the provision of unsolicited navigational instructions by continuing to provide estimations that match the navigational instructions.

A method, apparatus and computer program product are therefore provided in accordance with an example embodiment in order to provide navigational instructions in a manner that does not require the user to view the navigational instructions. Thus, a user who believes that they already know the directions to the destination may provide user input along the route that is representative of the user's estimation of the navigational instructions. So long as the user's estimation of the navigational instructions is correct, the user need not view the navigational instructions and may remain focused on their other activities. However, in an instance in which the user's estimation fails to match a navigational instruction, the user may be alerted so as to avoid deviating from the intended route.

As described above, FIG. 2 is a flowchart of a system, method, and computer program product according to an example embodiment of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the operations described herein may be embodied by computer program instructions of a computer program product. In this regard, the computer program product(s) which embody the operations described herein may be stored by one or more memory devices 14 of a mobile terminal 40 and executed by a processor 12 of the mobile terminal. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

In some embodiments, certain ones of the operations above may be modified or further amplified. Furthermore, in some embodiments, additional optional operations may be included, such as by shown by block 30 having a dashed outline in FIG. 2. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while described above in conjunction with a mobile terminal, various types of user devices may embody example embodiments of the present invention including, but not limited to, a navigational system, e.g., a GPS, eyewear, e.g., eyeglasses, a head mounted display or the like. As will be understood, other types of user input representative of the user's estimation of the navigation instruction may be provided including tiling of the user's head in the context of a head mounted display, tapping of a particular earpiece in the context of eyewear or the like. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of a user input representative of an estimation by a user of an upcoming navigational instruction prior to the upcoming navigational instruction being provided to the user, wherein the user input comprises a movement of a hand-held or wearable device such that the movement is representative of the estimation of the upcoming navigational instruction and the user input is not attributable to travel by the user along a route to a destination;
   in response to receiving the indication of the user input received prior to the upcoming navigational instruction being provided to the user and not attributable to travel by the user along a route to a destination, determining, with a processor, whether the estimation by the user matches the upcoming navigational instruction; and
   causing feedback to be generated for provision via the hand-held or wearable device at least in an instance in which the estimation by the user fails to match the upcoming navigational instruction and preventing feedback from being generated in an instance in which the estimation by the user matches the upcoming navigational instruction.

2. A method according to claim 1 wherein the feedback comprises a non-visual indication regarding the estimation by the user failing to match the upcoming navigational instruction.

3. A method according to claim 1 wherein the feedback relates to the estimation by the user failing to match the upcoming navigational instruction and is generated and provided prior to provision of the upcoming navigational instruction.

4. A method according to claim 3 wherein causing feedback to be generated comprises causing the upcoming navigational instruction to be provided in an instance in which the estimation by the user fails to match the upcoming navigational instruction.

5. The method of claim 1, wherein the user input comprises a rotation of a device based on the estimation by the user of the upcoming navigational instruction.

6. The method of claim 1, wherein the user input comprises a touch input to a device based on the estimation by the user of the upcoming navigational instruction.

7. The method of claim 1, wherein the user input comprises an audible input based on the estimate by the user of the upcoming navigational instruction.

8. The method of claim 1, wherein the indication of the user input representative of an estimation by a user of an upcoming navigational instruction is received prior to an associated navigation being made by the user.

9. A method according to claim 1 wherein causing feedback to be generated comprises causing non-visual feedback to be generated.

10. A method according to claim 1 further comprising causing a visual indication of the upcoming navigational instruction to be generated.

11. An apparatus comprising at least one processor and at least one memory storing computer program code, the at least one memory and the computer program code configured to, with the processor, cause the apparatus to at least:
receive an indication of a user input representative of an estimation by a user of an upcoming navigational instruction prior to the upcoming navigational instruction being provided to the user, wherein the user input comprises a movement of a hand-held or wearable device such that the movement is representative of the estimation of the upcoming navigational instruction and the user input is not attributable to travel by the user along a route to a destination;
in response to receiving the indication of the user input received prior to the upcoming navigational instruction being provided to the user and not attributable to travel by the user along a route to a destination, determine whether the estimation by the user matches the upcoming navigational instruction; and
cause feedback to be generated for provision via the hand-held or wearable device at least in an instance in which the estimation by the user fails to match the upcoming navigational instruction and prevent feedback from being generated in an instance in which the estimation by the user matches the upcoming navigational instruction.

12. An apparatus according to claim 11 wherein the feedback comprises a non-visual indication regarding the estimation by the user failing to match the upcoming navigational instruction.

13. An apparatus according to claim 11, wherein the feedback relates to the estimation by the user failing to match the upcoming navigational instruction and is generated and provided prior to provision of the upcoming navigational instruction.

14. An apparatus according to claim 11 wherein causing feedback to be generated comprises causing the upcoming navigational instruction to be provided.

15. An apparatus according to claim 11 wherein the at least one memory and the computer program code are configured to, with the processor, cause the apparatus to cause feedback to be generated by causing non-visual feedback to be generated.

16. An apparatus according to claim 11 wherein the at least one memory and the computer program code are further configured to, with the processor, cause the apparatus to cause a visual indication of the upcoming navigational instruction to be generated.

17. A computer program product comprising at least one non-transitory computer-readable storage medium having computer-executable program code portions stored therein, the computer-executable program code portions comprising program instructions configured to:
receive an indication of a user input representative of an estimation by a user of an upcoming navigational instruction prior to the upcoming navigational instruction being provided to the user, wherein the user input comprises a movement of a hand-held or wearable device such that the movement is representative of the estimation of the upcoming navigational instruction and the user input is not attributable to travel by the user along a route to a destination;
in response to receiving the indication of the user input received prior to the upcoming navigational instruction being provided to the user and not attributable to travel by the user along a route to a destination, determine whether the estimation by the user matches the upcoming navigational instruction; and
cause feedback to be generated for provision via the hand-held or wearable device at least in an instance in which the estimation by the user fails to match the upcoming navigational instruction and prevent feedback from being generated in an instance in which the estimation by the user matches the upcoming navigational instruction.

18. A computer program product according to claim 17 wherein the feedback comprises a non-visual indication regarding the estimation by the user failing to match the upcoming navigational instruction.

19. A computer program product according to claim 17 wherein feedback relates to the estimation by the user failing to match the upcoming navigational instruction and is generated and provided prior to provision of the upcoming navigational instruction.

20. A computer program product according to claim 17 wherein causing feedback to be generated comprises causing the upcoming navigational instruction to be provided.

* * * * *